United States Patent
Mori et al.

(10) Patent No.: US 7,561,371 B2
(45) Date of Patent: Jul. 14, 2009

(54) MAGNETIC DISK DEVICE, SERVO-INFORMATION WRITING DEVICE, MAGNETIC DISK, AND MAGNETIC DISK DEVICE MANUFACTURING METHOD

(75) Inventors: Kazunori Mori, Kawasaki (JP); Isamu Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/523,478

(22) Filed: Sep. 19, 2006

(65) Prior Publication Data
US 2007/0279796 A1    Dec. 6, 2007

(30) Foreign Application Priority Data
May 31, 2006    (JP)    .............................. 2006-152898

(51) Int. Cl.
G11B 5/596    (2006.01)
(52) U.S. Cl. .................................. 360/77.08
(58) Field of Classification Search .............. 360/77.08, 360/75, 51, 66, 48, 69, 15
See application file for complete search history.

(56) References Cited

U.S. PATENT DOCUMENTS

| 5,226,027 | A  | * | 7/1993  | Bakx ........................ 369/47.55 |
| 6,987,636 | B1 | * | 1/2006  | Chue et al. .................... 360/75 |
| 7,068,459 | B1 | * | 6/2006  | Cloke et al. ................... 360/75 |
| 7,116,511 | B2 | * | 10/2006 | Ehrlich ........................ 360/75 |
| 7,248,426 | B1 | * | 7/2007  | Weerasooriya et al. ........ 360/51 |
| 2003/0210491 | A1 |   | 11/2003 | Kuroda et al. |
| 2005/0013030 | A1 | * | 1/2005  | Ehrlich ........................ 360/51 |
| 2005/0231841 | A1 | * | 10/2005 | Kuo et al. ..................... 360/15 |
| 2006/0007586 | A1 | * | 1/2006  | Ehrlich ........................ 360/75 |
| 2006/0171052 | A1 | * | 8/2006  | Nishida et al. ................ 360/48 |
| 2006/0262449 | A1 | * | 11/2006 | Sai et al. ...................... 360/69 |
| 2007/0064325 | A1 | * | 3/2007  | Bi et al. ....................... 360/48 |
| 2007/0103807 | A1 | * | 5/2007  | Yang ........................... 360/66 |
| 2007/0211368 | A1 | * | 9/2007  | Shibano et al. ................ 360/75 |
| 2007/0223127 | A1 | * | 9/2007  | Maruyama et al. ............ 360/51 |

FOREIGN PATENT DOCUMENTS

| JP | 5-205419    | 8/1993  |
| JP | 2003-323772 | 11/2003 |

* cited by examiner

Primary Examiner—Fred Tzeng
(74) Attorney, Agent, or Firm—Greer, Burns & Crain, Ltd.

(57) ABSTRACT

A magnetic disk incorporated into a magnetic disk device is divided radially into a plurality of areas. An inner-circumference area has servo information written thereon at a low frequency. An outer-circumference area has servo information written thereon at a high frequency. The magnetic disk device creates concentric tracks on the magnetic disk with a magnetic disk rotation center as the center of the concentric tracks and selects a dividing track that acts as a demarcation for switching the area from which servo information will be read. The magnetic disk device then deletes all the servo information that is not going to be read in each of the areas divided by the dividing track.

10 Claims, 10 Drawing Sheets

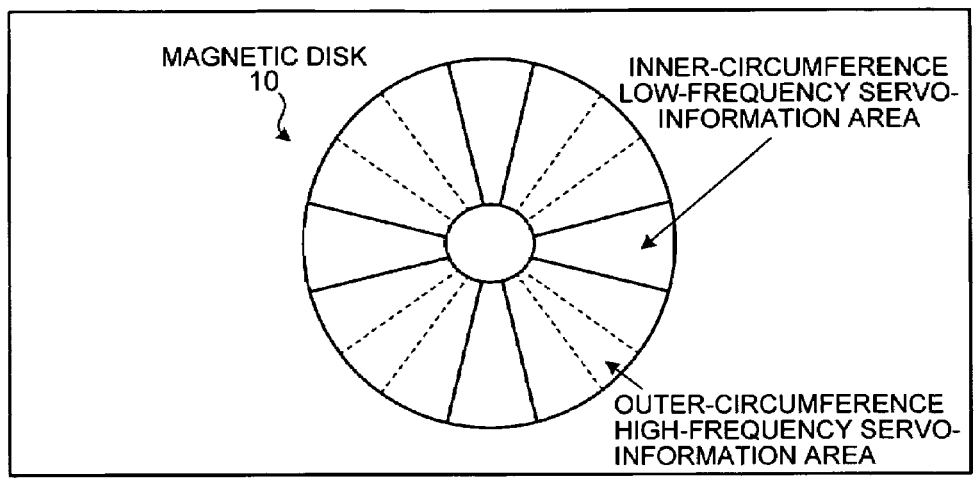
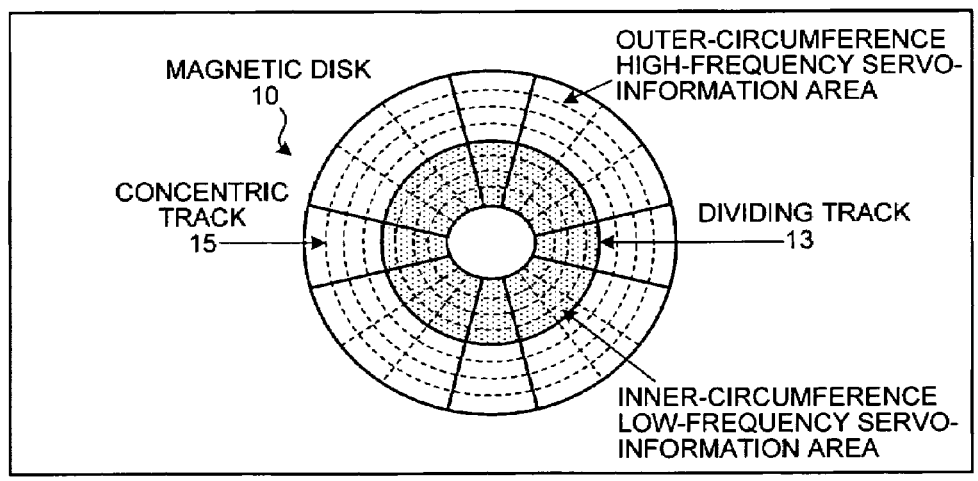
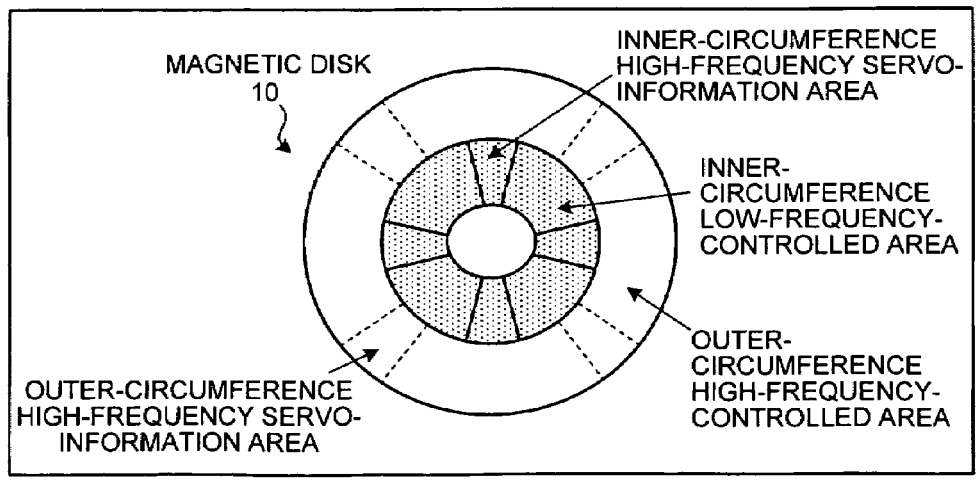

FIG.2A

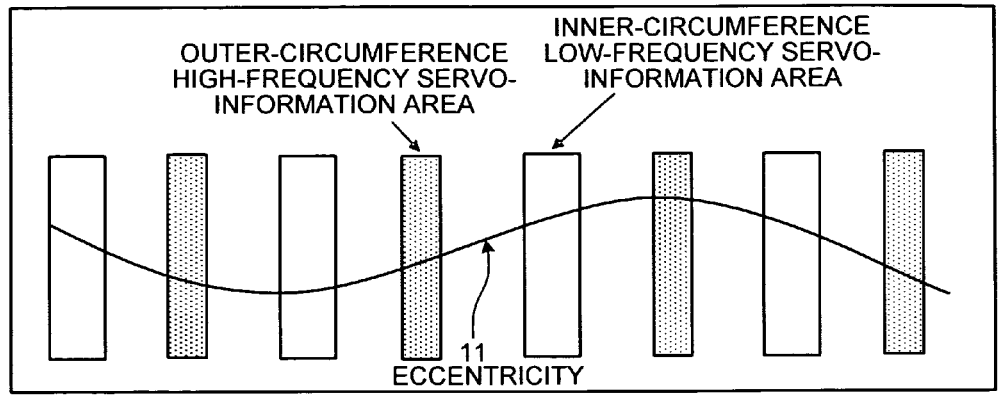

OUTER-CIRCUMFERENCE HIGH-FREQUENCY SERVO-INFORMATION AREA

INNER-CIRCUMFERENCE LOW-FREQUENCY SERVO-INFORMATION AREA

11 ECCENTRICITY

FIG.2B

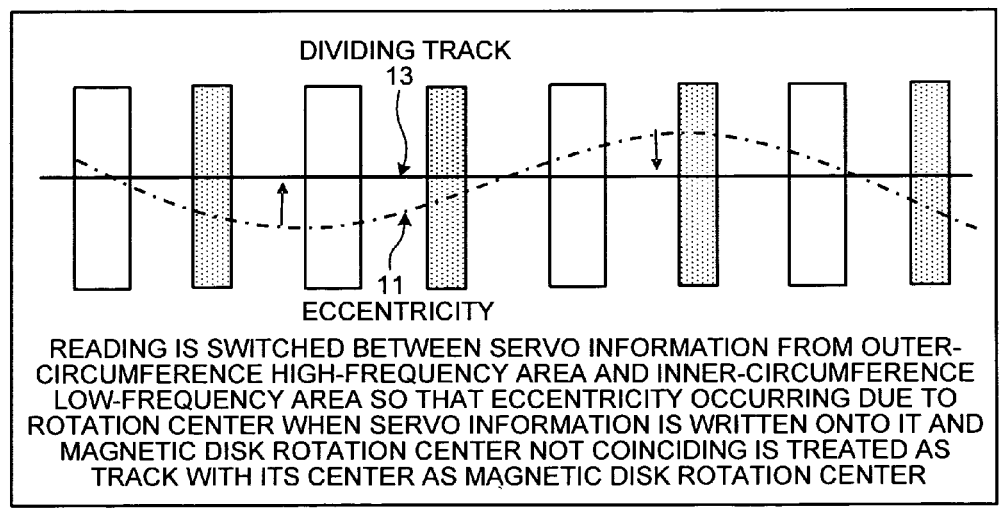

DIVIDING TRACK 13

11 ECCENTRICITY

READING IS SWITCHED BETWEEN SERVO INFORMATION FROM OUTER-CIRCUMFERENCE HIGH-FREQUENCY AREA AND INNER-CIRCUMFERENCE LOW-FREQUENCY AREA SO THAT ECCENTRICITY OCCURRING DUE TO ROTATION CENTER WHEN SERVO INFORMATION IS WRITTEN ONTO IT AND MAGNETIC DISK ROTATION CENTER NOT COINCIDING IS TREATED AS TRACK WITH ITS CENTER AS MAGNETIC DISK ROTATION CENTER

FIG.2C

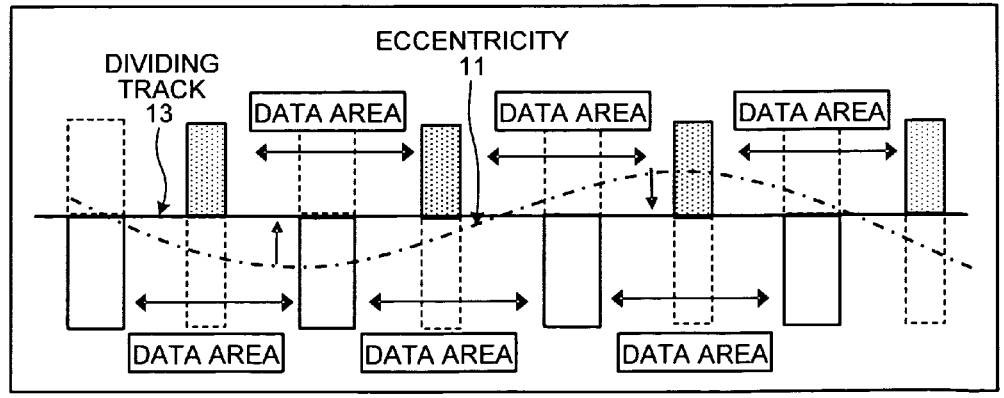

DIVIDING TRACK 13

ECCENTRICITY 11

DATA AREA

US 7,561,371 B2

MAGNETIC DISK DEVICE, SERVO-INFORMATION WRITING DEVICE, MAGNETIC DISK, AND MAGNETIC DISK DEVICE MANUFACTURING METHOD

BACKGROUND OF THE INVENTION

1. Field of the Invention

The present invention relates to a magnetic disk device, a servo-information writing device, a magnetic disk, and a method of manufacturing a magnetic disk device.

2. Description of the Related Art

In a conventional magnetic disk (see FIG. 8), servo information (information for controlling the position and the speed of a head) required by the magnetic disk device is written at the same frequency (low peak density) across the entire radial width (ranging from the inner circumference to the outer circumference of the magnetic disk), as a seek operation of the magnetic disk necessitates reading the servo information at a fixed sampling frequency. Over the years, technologies for improving the format volume of the conventional magnetic disk and for accurately reading the servo information written onto the conventional magnetic disk have also been disclosed.

For example, Japanese Patent Application Laid-Open No. H5-205419 discloses a technology for improving the format volume of the magnetic disk by reducing the ratio of the servo information occupying the track volume by varying the write frequency at which the servo information is written according to the radial position of the magnetic disk. That is, this technology involves writing the servo information by increasing a bit density towards the outer circumference.

FIG. 9 is schematic for explaining the conventional technology described above. As shown in FIG. 9, a frequency-switching track demarcates an area towards the inner circumference where the servo information is written at a low frequency, and an area towards the outer circumference where the servo information is written at a high frequency. More format volume is obtained by this method of writing servo information than when the servo information is written at the same frequency.

Japanese Patent Application Laid-Open No. 2003-323772 discloses a technology for reducing the time required for head change for every magnetic disk necessitated by eccentricity that occurs due to the magnetic disk rotation center when servo information is written onto it and the magnetic disk rotation center not coinciding when a plurality of magnetic disks with servo information written thereon are incorporated into the magnetic disk device. This technology works by creating concentric tracks on the magnetic disk in its incorporated state, and causing the head to follow the track.

FIG. 10 is a schematic for explaining the conventional technology described above. As shown in FIG. 10, when the magnetic disk rotation center and the magnetic disk rotation center when the servo information is written onto it do not coincide, concentric tracks (one of which is represented by the dashed line A) are created in its incorporated state, and the head is made to follow the track. Thus, an improvement is brought about in terms of being able to easily read the servo information written onto the magnetic disk and reducing the time required for the head change for every magnetic disk.

Another technology involves causing the head to follow the servo information itself. In this case, when a magnetic disk having servo information written at different frequencies in the area towards the inner circumference and the area towards the outer circumference, such as the one disclosed in Japanese Patent Application Laid-Open No. H5-205419, is incorporated in a magnetic disk device, and the magnetic disk rotation center and the magnetic disk rotation center when the servo information is written onto it do not coincide, the head is made to follow the servo information.

FIG. 11 is a schematic for explaining the technology described above. As shown in FIG. 11, three tracks will be affected by the switching of frequency due to an eccentricity magnitude, the three tracks being the frequency-switching track (represented by the dashed line B) and the track on either side of the frequency-switching track. Thus, the format volume of the magnetic disk can be increased by limiting the number of unusable tracks.

However, no improvement can be seen in the format volume by incorporating a magnetic disk with servo information written at different frequencies in the area towards the inner circumference and the area towards the outer circumference (see Japanese Patent Application Laid-Open No. H5-205419) into a magnetic disk device, and creating concentric tracks when the center of the magnetic disk and the center of the magnetic disk when the servo information is written onto it do not coincide, and causing the head to follow the servo information (see Japanese Patent Application Laid-Open No. 2003-323772).

FIG. 12 is a schematic for explaining why the conventional technology described above produces no improvement in the format volume. As shown in FIG. 12, as the tracks that are read are switched in such a way that they are not affected by the eccentricity of the servo information, the tracks that fall in the range of the eccentricity magnitude cannot be used as normal tracks as servo information written at different frequencies are read from these tracks in addition to the servo information from the frequency-switching track (represented by the dashed line C). As a result, there is a loss of format volume.

FIG. 13 is a schematic for explaining the above description in further detail. If the head is made to follow the servo information, according to how the servo information is written, sometimes the servo information in the area in the outer circumference and sometimes the servo information in the area in the inner circumference is read. As a result, the tracks in that range cannot be used as normal tracks, leading to a loss of format volume.

SUMMARY OF THE INVENTION

It is an object of the present invention to at least partially solve the problems in the conventional technology.

According to an aspect of the present invention, a magnetic disk device that holds a magnetic disk having servo information written thereon includes a magnetic disk holding unit that holds the magnetic disk having written thereon the servo information as a first set of servo information written at a predetermined first frequency at predetermined intervals in a magnetic disk rotation direction and a second set of servo information written at a predetermined second frequency at the predetermined intervals in a direction opposite to the magnetic disk rotation direction; and a track selecting unit that creates concentric tracks on the magnetic disk held by the magnetic disk holding unit with the magnetic disk rotation center as the center of the concentric tracks as well as selects a dividing track that acts as a demarcation for switching areas from which the servo information will be read.

According to another aspect of the present invention, a servo-information writing device that writes servo information onto a magnetic disk incorporated into a magnetic disk device includes a servo information writing unit that writes a first set of servo information at a predetermined first frequency at predetermined intervals in a magnetic disk rotation direction and a second set of servo information at a predetermined second frequency at the predetermined intervals in a direction opposite to the magnetic disk rotation direction.

According to still another aspect of the present invention, a magnetic disk having written thereon servo information for controlling the position and speed of a head of a magnetic disk device, the magnetic disk including a first area where a first set of servo information is written at a predetermined first frequency at predetermined intervals in a magnetic disk rotation direction and a second area where a second set of servo information is written at a predetermined second frequency at the predetermined intervals in a direction opposite to the magnetic disk rotation direction.

According to still another aspect of the present invention, a manufacturing method of a magnetic disk device applied for manufacturing a magnetic disk device configured to hold a magnetic disk having servo information written thereon includes writing the servo information as a first set of servo information as a first set of servo information written at a predetermined first frequency at predetermined intervals in a magnetic disk rotation direction and a second set of servo information written at a predetermined second frequency at the predetermined intervals in a direction opposite to the magnetic disk rotation direction; holding the magnetic disk having the servo information written thereon at the writing; creating concentric tracks on the magnetic disk held at the holding with the magnetic disk rotation center as the center of the concentric tracks and selecting a dividing track that acts as a demarcation for areas from which the servo information will be read; and deleting all the servo information that will not be read from each of the areas divided by the dividing track selected at the creating.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A to 1C are schematics for explaining an overview and salient feature of a magnetic disk device according a first embodiment of the present invention;

FIGS. 2A to 2C are schematics for explaining the salient feature of the magnetic disk device according to the first embodiment;

DETAILED DESCRIPTION OF THE PREFERRED EMBODIMENTS

Figure 3:
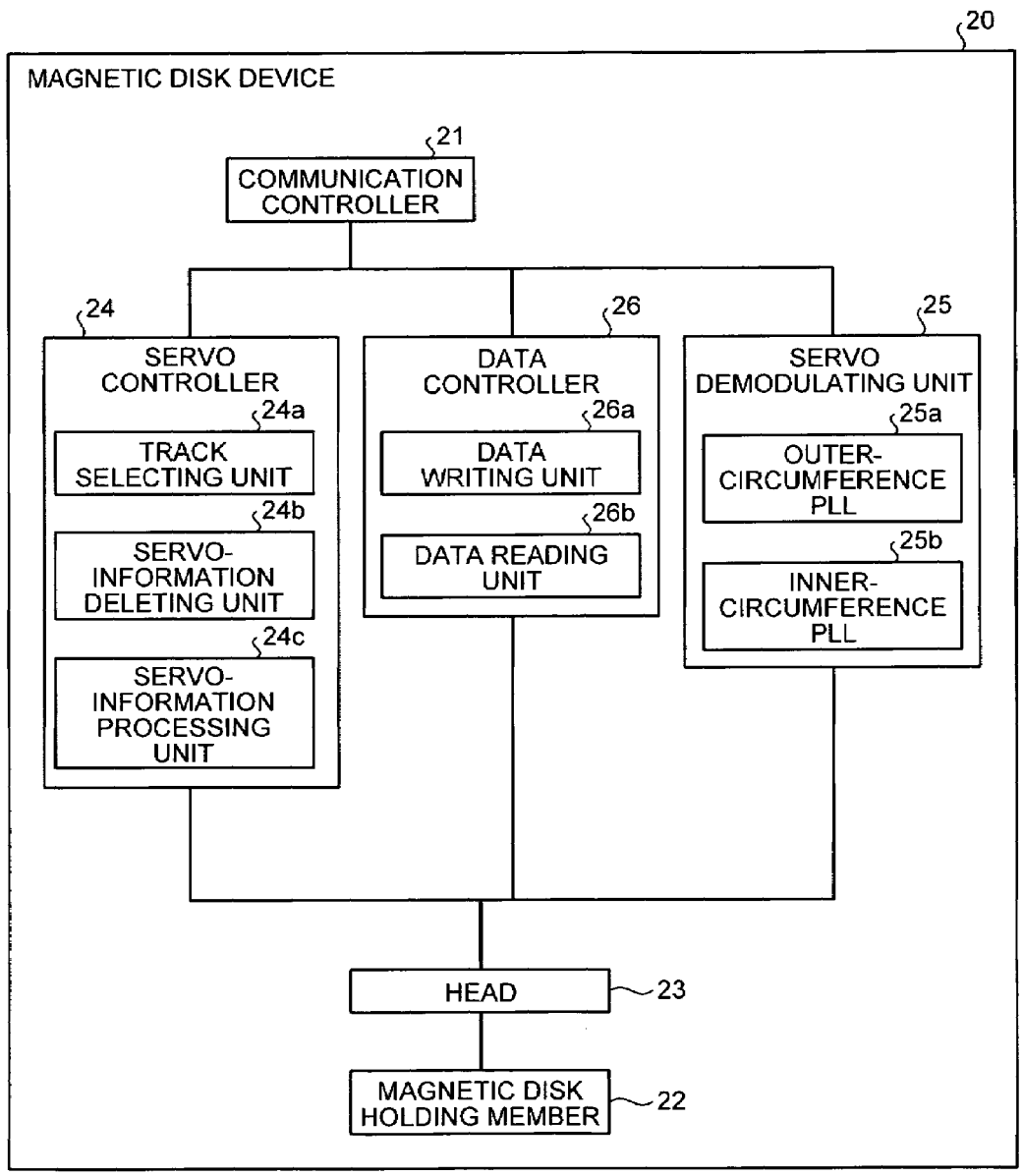
FIG. 3 is a block diagram of the magnetic disk device according to the first embodiment.

Exemplary embodiments of the present invention are described below with reference to the accompanying drawings.

An overview and the salient feature, the structure, and the process flow of the magnetic disk device according to a first embodiment of the present invention are explained below one after the other.

An overview and the salient feature of the magnetic disk device according to the first embodiment are explained below with reference to FIGS. 1A to 1C, and FIGS. 2A to 2C. FIGS. 1A to 1C are schematics for explaining the overview and the salient feature of the magnetic disk device according to the first embodiment. FIGS. 2A to 2C are schematics for explaining the salient feature of the magnetic disk device according to the first embodiment.

The magnetic disk device according to the first embodiment, in summary, reads servo information from a magnetic disk 10. The salient feature of the magnetic disk device according to the first embodiment lies in the fact that it increases the format volume of a magnetic disk and reduces the number of unusable tracks.

As shown in FIG. 1A, the magnetic disk 10 incorporated in the magnetic disk device has written thereon a first set of servo information at a predetermined frequency at predetermined intervals in a rotation direction of the magnetic disk 10, and a second set of servo information at a different frequency than the predetermined frequency at which the first set of servo information is written and at the predetermined intervals in the opposite direction from the first set of servo information. Specifically, the magnetic disk 10 is divided into a plurality of sectors radially (like a fan). In the sectors enclosed by solid lines, the servo information is written at an inner-circumference low frequency and in the sectors enclosed by dashed lines, the servo information is written at an outer-circumference high frequency. The servo information is written onto the magnetic disk 10 in a burst pattern by a servo-information writing device. The magnetic disk can be substituted with any portable physical medium, such flexible disk (FD), compact disk-read-only memory (CD-ROM), magneto optical (MO) disk, digital versatile disk (DVD), and integrated circuit (IC) card.

The magnetic disk device that includes the magnetic disk 10 creates concentric tracks with the rotation center of the magnetic disk 10 as the center of the tracks as well as selects a dividing track that acts as a demarcation for switching the area from which servo information will be read. Specifically, the magnetic disk device creates a plurality of concentric tracks at regular intervals, with the rotation center of the magnetic disk 10 as the center of the concentric tracks. In addition, the magnetic disk device selects a dividing track 13 as a demarcating position that allows stable demodulation of the outer-circumference servo information (the sectors enclosed by dashed lines), thus dividing the magnetic disk 10 into an outer-circumference high-frequency-controlled area and an inner-circumference low-frequency-controlled area (see FIG. 1B). The space between the tracks is determined according to the number of concentric tracks created on the magnetic disk 10.

The magnetic disk device then deletes all the servo information that is not going to be read from each of the areas divided by the dividing track 13. Specifically, the magnetic disk device deletes the outer-circumference high-frequency servo information from the inner-circumference low-frequency-controlled area (represented by the shaded area), and the inner-circumference low-frequency servo information from the outer-circumference high-frequency-controlled area (see FIG. 1C).

FIGS. 1A to 1C are explained further with reference to FIGS. 2A to 2C. The magnetic disk device creates concentric tracks in the outer-circumference high-frequency servo information area and the inner-circumference low-frequency servo information area (see FIG. 2A), and in addition, selects the dividing track 13 that acts as a demarcation for switching the area from which servo information will be read (see FIG. 2B). Eccentricity 11 occurs due to a deviation between the magnetic disk rotation center and a track center. When reading the servo information, the magnetic disk device calculates a track based on the set tract and the eccentricity 11 and reads information along the calculated track.

The magnetic disk device then deletes the outer-circumference high-frequency servo information from the inner-circumference low-frequency servo information area, and the inner-circumference low-frequency servo information from the outer-circumference high-frequency servo information area. Thus, the magnetic disk device recovers the switching track as well as the track on either side of the switching track as unused area and the area from where servo information was deleted is used as data area (see FIG. 2C).

Thus, the magnetic disk device according to the first embodiment enables the write frequency of the servo information to be increased in the area in the outer circumference and limits the number of tracks that are affected by the switching of the area from which the servo information is read to three. Consequently, the format volume can be increased and the number of unusable tracks is minimized to three.

A structure of a magnetic disk device 20 is explained below. FIG. 3 is a block diagram of the magnetic disk device 20. The magnetic disk device 20 includes a communication controller 21, a magnetic disk holding member 22, a head 23, a servo controller 24, a servo demodulating unit 25, and a data controller 26.

The communication controller 21 controls the communication of various types of information processed by the magnetic disk device 20. Specifically, the communication controller 21 performs tasks such as receiving a request to read data or write data from another device (such as a host computer) connected to the magnetic disk device 20, sending data requested through a read data request, etc.

The magnetic disk holding member 22 holds the magnetic disk that has written thereon a set of servo information at a predetermined frequency at a predetermined interval in the rotation direction of the magnetic disk, and another set of servo information written at a different frequency than the predetermined frequency at which the first set of servo information is written and at a predetermined interval in the opposite direction from the first set of servo information. Specifically, the magnetic disk holding member 22 holds the magnetic disk of above description provided by the manufacturer or assembled by the user until the user deactivates the integration. The magnetic disk holding member 22 corresponds to "magnetic disk holding member" in the claims.

The head 23 reads servo information and reads data from and writes data to the magnetic disk. Specifically, the head 23 reads the servo information written onto the magnetic disk 10 at a sampling frequency of regular intervals and writes data to or reads data from the magnetic disk 10 in response to the data write or data read request from another terminal device connected to the magnetic disk device 20.

The servo controller 24 performs various processes related to the servo information written onto the magnetic disk. In close relevance to the present invention, the servo controller 24 includes a track selecting unit 24a, a servo-information deleting unit 24b, and a servo-information processing unit 24c. The track selecting unit 24a corresponds to "track selecting unit" in the claims, and the servo-information deleting unit 24b corresponds to "servo-information deleting unit" in the claims.

The track selecting unit 24a creates concentric tracks with the rotation center of the magnetic disk held by the magnetic disk holding member 22 as their center as well as selects a dividing track that acts as a demarcation for switching the area from which servo information will be read. Specifically, the track selecting unit 24a creates a plurality of concentric tracks 15 with the rotation center of the magnetic disk 10 as their center at regular intervals as well as selects the dividing track 13 as a demarcating position that allows stable demodulation of the outer-circumference servo information, thus dividing the magnetic disk 10 into an outer-circumference high-frequency-controlled area and an inner-circumference low-frequency-controlled area (see FIG. 1B). As the ratio of the outermost radius to the innermost radius is 2:1, the frequency at which servo information can be written onto the outer-circumference high-frequency-controlled area is about 1.5 times the frequency at which servo information can be written onto the inner-circumference low-frequency-controlled area.

The servo-information deleting unit 24b deletes all the servo information that is not going to be read from each of the areas divided by the dividing track 13. Specifically, the servo-information deleting unit 24b deletes the outer-circumference high-frequency servo information from the inner-circumference low-frequency-controlled area (represented by the shaded area), and the inner-circumference low-frequency servo information from the outer-circumference high-frequency-controlled area (see FIG. 1C).

The servo-information processing unit 24c processes the servo information that is read. Specifically, the servo-information processing unit 24c receives the servo information read by the head 23 at a sampling frequency of regular intervals, and based on the servo information received, controls the position and speed of the head 23.

The servo demodulating unit 25 demodulates the servo information that is read. In close relevance to the present invention, the servo demodulating unit 25 includes an outer-circumference phase-locked loop (PLL) (phase synchronizing circuit) 25a and an inner-circumference PLL 25b. The outer-circumference PLL 25a has set therein the outer-circumference high frequency and the inner-circumference PLL 25b has set therein the inner-circumference low frequency. When reading the servo information across the dividing track 13, the servo information is read by switching between the outer-circumference PLL 25a and the inner-circumference PLL 25b. The servo demodulating unit 25 uses a simple method of changing a register value to switch between the outer-circumference PLL 25a and the inner-circumference PLL 25b. The servo demodulating unit 25 corresponds to "servo demodulating unit" in the claims.

The data controller 26 writes data to and reads data from the magnetic disk 10. In close relevance to the present invention, the data controller 26 includes a data writing unit 26a and a data reading unit 26b.

The data writing unit 26a writes data to the magnetic disk 10, and specifically, writes data to the magnetic disk 10 according to a write data request received from the communication controller 21.

The data reading unit 26b reads data from the magnetic disk 10, and specifically, reads data from the magnetic disk 10 according to a read data request received from the communication controller 21.

Figure 4:
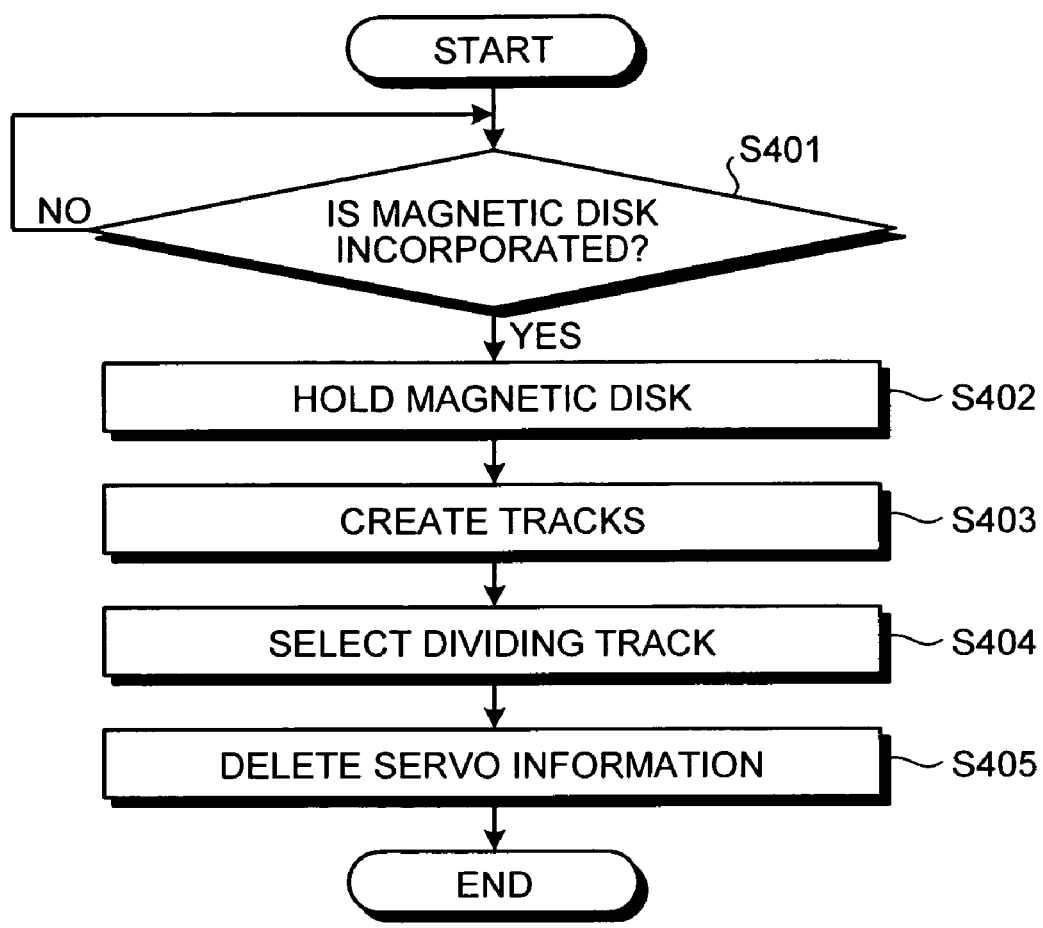
FIG. 4 is a flowchart of a servo-information deletion process.

A servo-information deletion process is described below. FIG. 4 is a flowchart of the servo-information deletion process.

Upon incorporation of the magnetic disk 10 in the magnetic disk device 20 (Yes at step S401), the magnetic disk holding member 22 holds the magnetic disk 10 (step S402).

The track selecting unit 24a of the magnetic disk device 20 creates the concentric tracks with the rotation center of the magnetic disk 10 as their center (step S403) as well as selects the dividing track 13 that acts as a demarcation for switching the area from which servo information will be read (step S404).

The servo-information deleting unit 24b of the magnetic disk device 20 deletes all the servo information that is not going to be read from each of the areas divided by the dividing track 13 (step S405). Specifically, the servo-information deleting unit 24b deletes the outer-circumference high-frequency servo information from the inner-circumference low-frequency-controlled area, and the inner-circumference low-frequency servo information from the outer-circumference high-frequency-controlled area.

Figure 5:
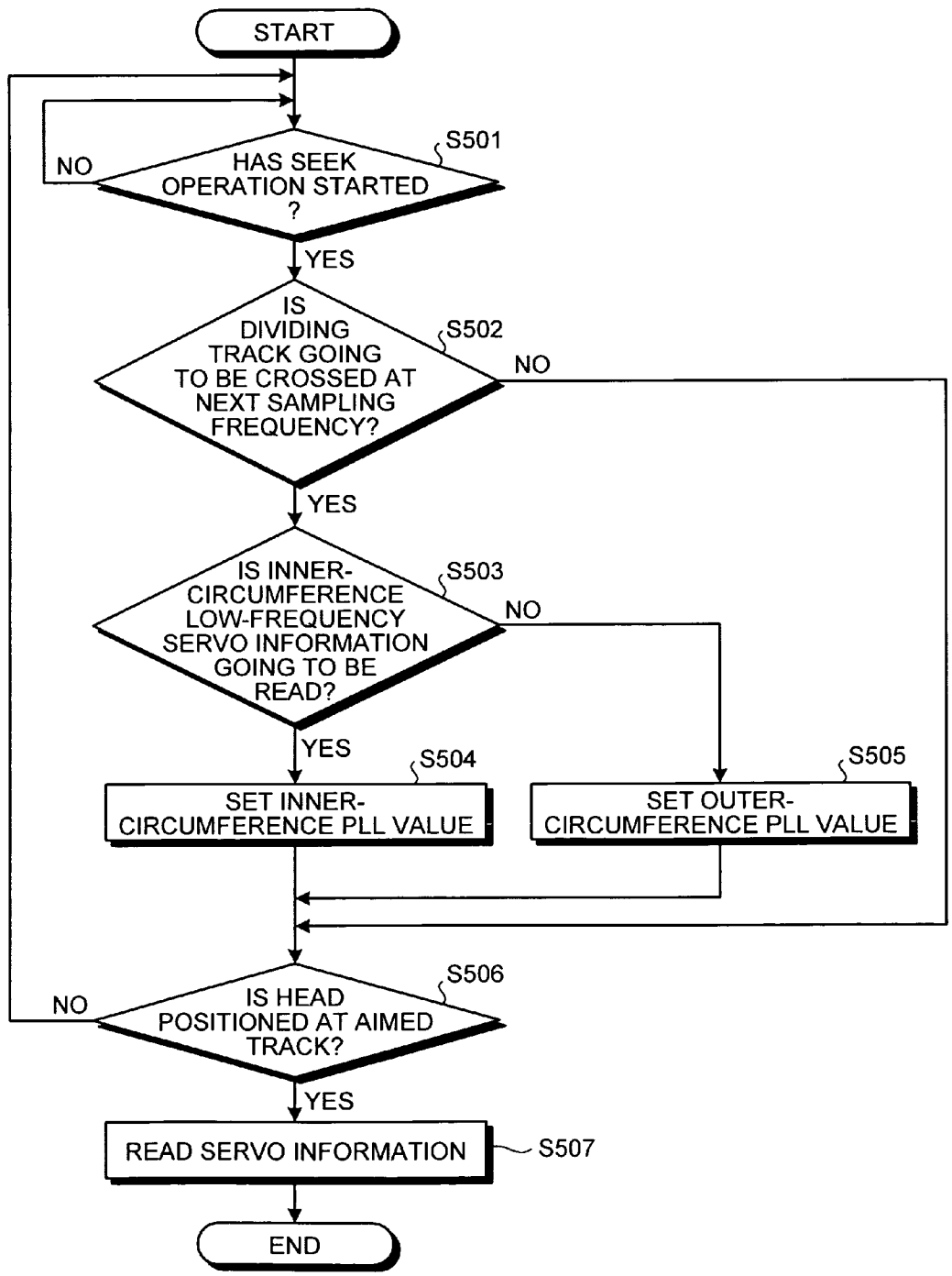
FIG. 5 is a flowchart of a servo-information reading process.

A servo-information reading process by the magnetic disk device is described below. FIG. 5 is a flowchart of the servo-information reading process.

Once a seek operation starts after the magnetic disk is incorporated (Yes at step S501), the magnetic disk device 20 determines whether the dividing track 13 will be crossed at the next sampling frequency (step S502).

If it is determined that the dividing track 13 will be crossed at the next sampling frequency (Yes at step S502), the magnetic disk device 20 determines whether the inner-circumference low-frequency servo information will be read (step S503).

If it is determined that the inner-circumference low-frequency servo information is going to be read (Yes at step S503), the servo demodulating unit 25 sets the value in the inner-circumference PLL 25b. If it is determined that the inner-circumference low-frequency servo information is not going to be read (No at step S503), that is, the outer-circumference high-frequency servo information is going to be read, the servo demodulating unit 25 sets the value in the outer-circumference PLL 25b (step S505).

The magnetic disk device 20 then determines whether the head 23 is positioned at an aimed track (step S506). If it is determined that the head 23 is positioned at the aimed track (Yes at step S506), the head 23 of the magnetic disk device 20 reads the servo information written on the magnetic disk 10 (step S507).

If it is determined that the head 23 is not positioned at the aimed track (No at step S506), the magnetic disk device 20 once again starts the seek operation (step S501).

If at step S502, it is determined that the dividing track 13 is not going to be crossed at the next sampling frequency (No at step S502), the magnetic disk device 20, determines whether the head 23 is positioned at the aimed track (step S506).

Thus, the magnetic disk device according to the first embodiment holds the magnetic disk 10 that has written thereon a set of servo information at a predetermined frequency at a predetermined interval in the rotation direction of the magnetic disk, and another set of servo information written at a different frequency than the predetermined frequency at which the first set of servo information is written and at a predetermined interval in the opposite direction from the first set of servo information, creates concentric tracks with the rotation center of the magnetic disk 10 as their center, selects the dividing track 13 that acts as a demarcation for switching the area from which servo information will be read, and deletes all the servo information that is not going to be read from each of the areas divided by the dividing track 13. Consequently, the write frequency of the servo information can be increased in the area in the outer circumference and the number of tracks that are affected by the switching of the area from which the servo information is read can be limited to three. As a result, the format volume can be increased and the number of unusable tracks can be minimized.

In the magnetic disk device according to the first embodiment, a plurality of phase synchronizing circuits are provided in accordance with the write frequencies at which servo information is written onto the magnetic disk 10. Consequently, the frequency of the area the head 23 will be traversing can be set at the start of a seek operation, and the phase synchronizing circuits (phase-locked loops (PLL)) can be easily switched. As a result, the time required for activating the appropriate phase synchronizing circuit when crossover of the dividing track takes place can be reduced, and error in reading servo information can be prevented.

The present invention is not restricted to the embodiment described above alone, but can have different forms. Other embodiments of the present invention are described below.

In the first embodiment, the magnetic disk 10 has servo information written thereon at two different frequencies and hence has two distinct areas (inner-circumference low-frequency-controlled area and outer-circumference high-frequency-controlled area) in the radial direction. However, a disk device divided into a plurality of areas (such as three) in the radial direction and having written thereon servo information at as many different frequencies can also be used.

Figure 6:
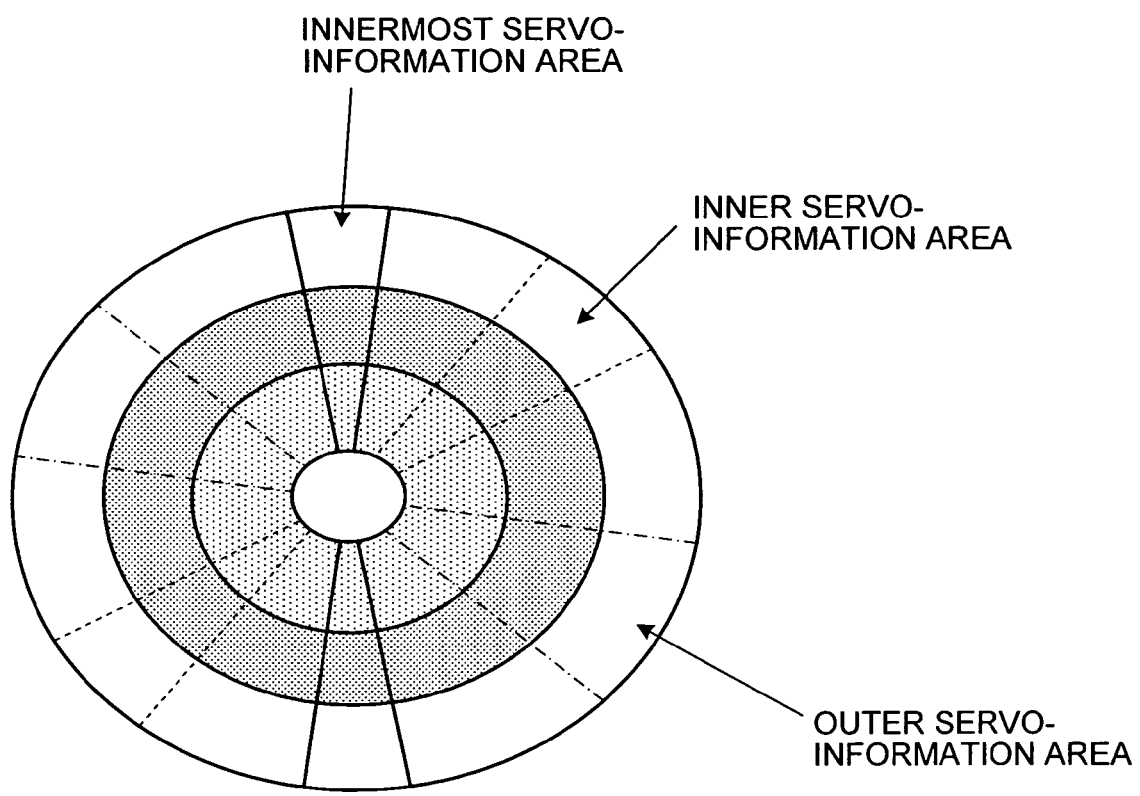
FIG. 6 is a schematic for explaining a magnetic disk device according to a second embodiment of the present invention.

FIG. 6 is a schematic for explaining the magnetic disk device according to a second embodiment. The magnetic disk used in this case is divided into three areas, namely, an innermost area, an inner area, and an outer area, and servo information in each of these areas is written at a different frequency. The magnetic disk device 20 in this case selects two dividing tracks, one dividing track acting as a demarcation between the innermost area and the inner area, and the other dividing track acting as a demarcation between the inner area and the outer area. The magnetic disk device 20 deletes all the servo information that is not going to be read from each of the three areas. The servo information is written onto the three areas of the magnetic disk by a servo information writing unit.

Further, the servo information can be written onto the magnetic disk 10 inwards in the area in the outer circumference and outwards in the area in the inner circumference. By adopting this method of writing servo information, side clinching that occurs due to the deletion of the servo information can be reduced. The servo information is written onto the magnetic disk by the servo-information writing device.

The track selecting unit 24a can be configured to evaluate the head of the magnetic disk and, based on the information obtained after the evaluation, select the dividing track that acts as a demarcation for switching the area from which servo information will be read. By doing so, the dividing track can be selected customized to a head with a small margin and the servo information can be read more stably. As a result, the content of the servo information written onto the disk can be guaranteed.

The magnetic disk device according to the first embodiment has two phase-locked loops. However, the magnetic disk device can have as many phase-locked loops as there are frequencies at which the servo information is written onto the magnetic disk 10.

The constituent elements of the magnetic disk device 20 shown in FIG. 3 are merely conceptual and may not necessarily physically resemble the structures shown in the drawing. The magnetic disk device 20 as a whole or in parts can be broken down or integrated (for example, the servo controller 24 and the data controller 26 can be integrated) either functionally or physically in accordance with the load or how the device is to be used. The process functions performed by the device are entirely or partially realized by a central processing unit (CPU) or a program executed by the CPU or by a hardware using wired logic.

The magnetic disk device 20 explained above is described as hardware. However, it can be implemented as software. In other words, a computer program can be executed on a computer system to realize the same functions as the magnetic disk device 20.

Figure 7:
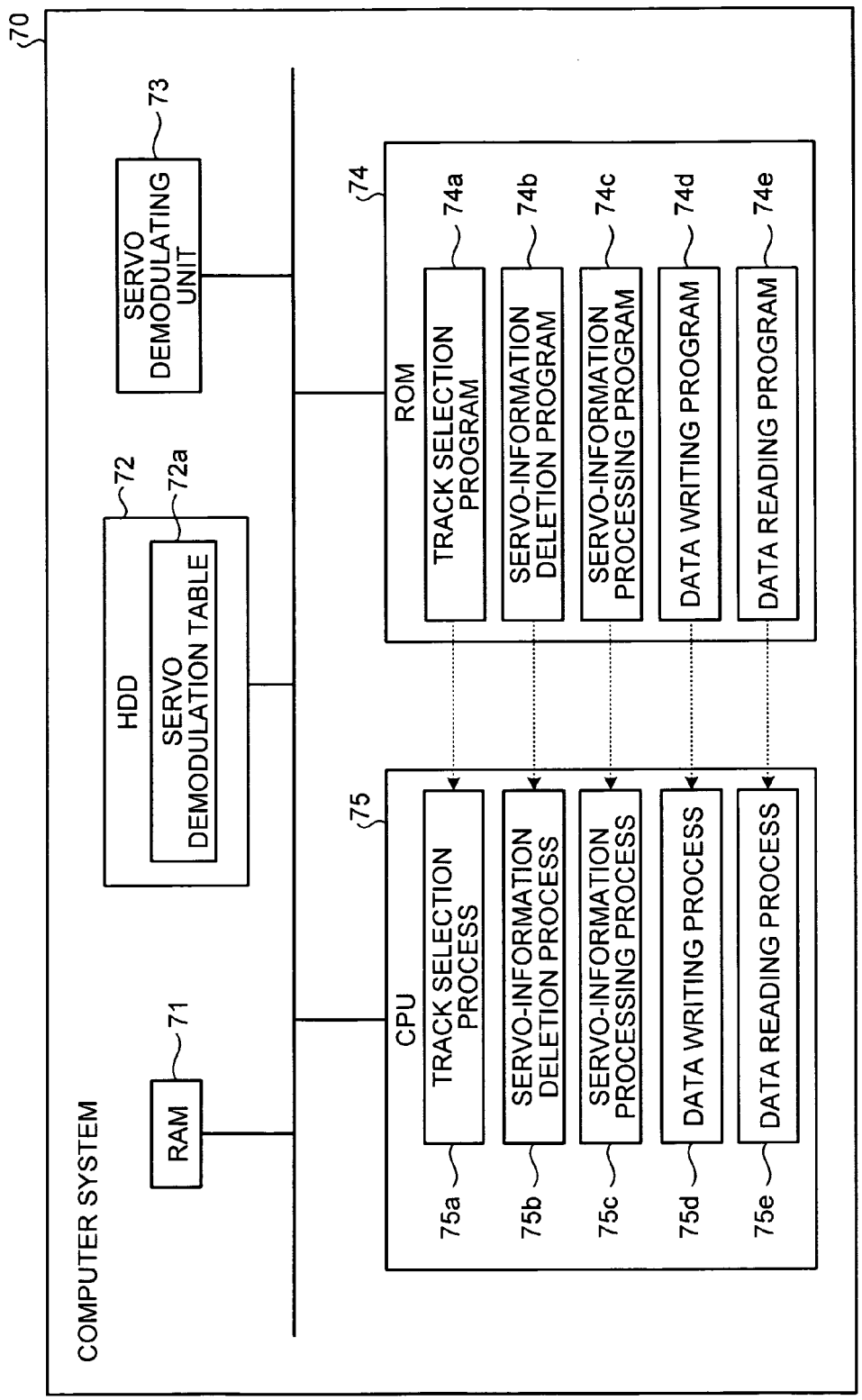
FIG. 7 is a drawing of a computer system that executes a magnetic disk control program.
Figure 8:
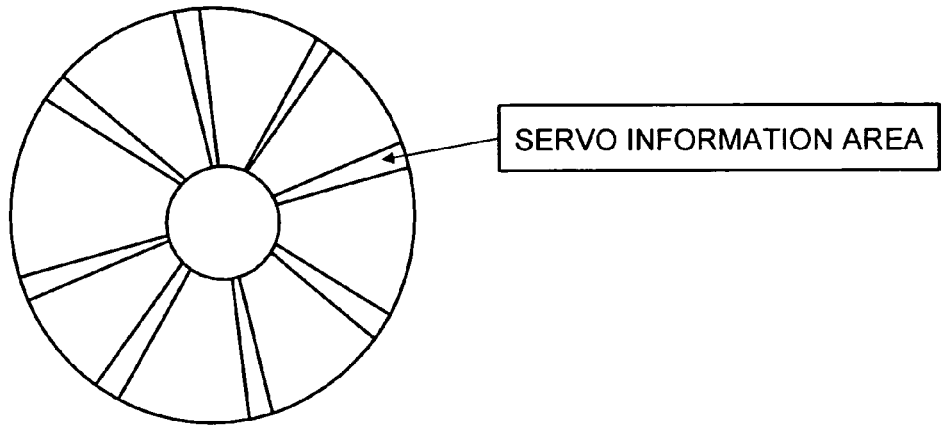
FIG. 8 is a schematic for explaining a conventional technology.
Figure 9:
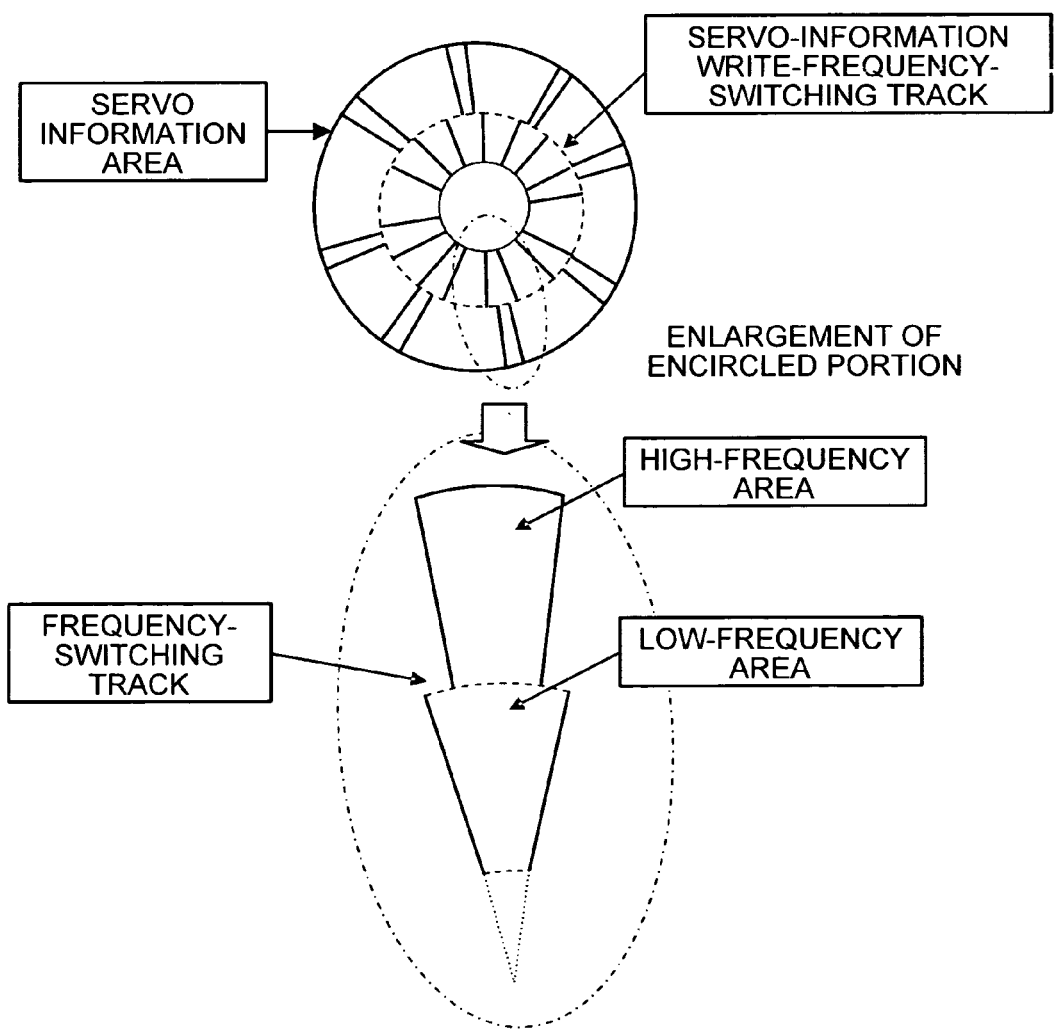
FIG. 9 is a schematic for explaining a conventional technology.
Figure 10:
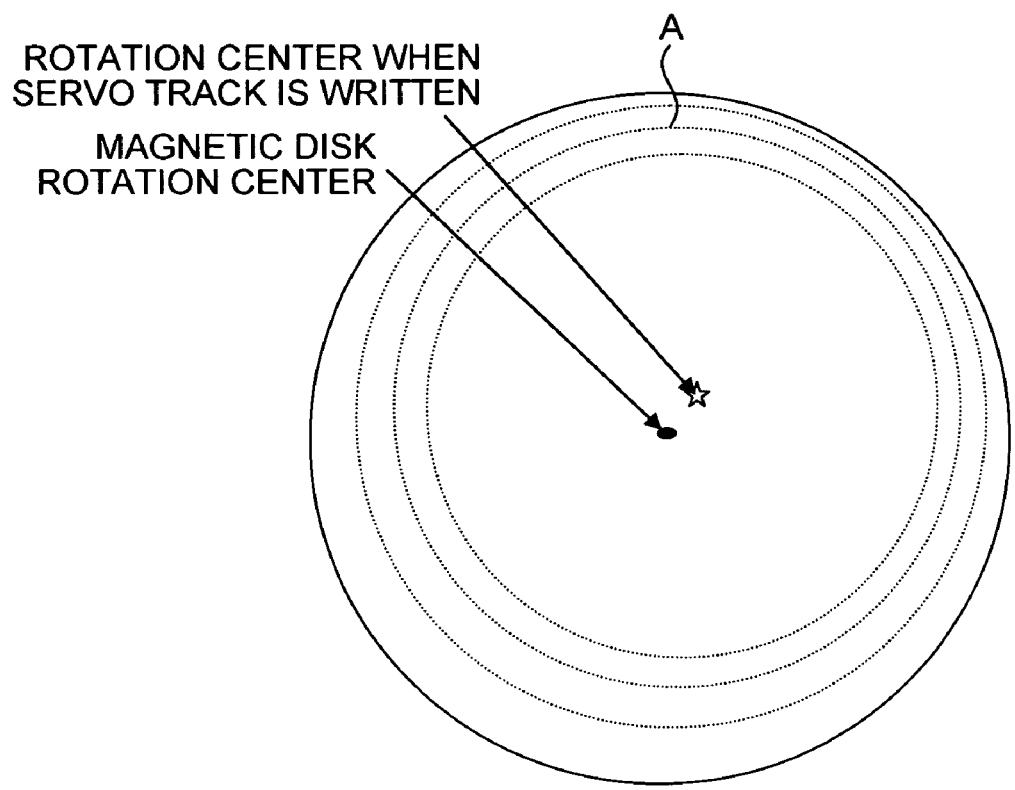
FIG. 10 is a schematic for explaining a conventional technology.
Figure 11:
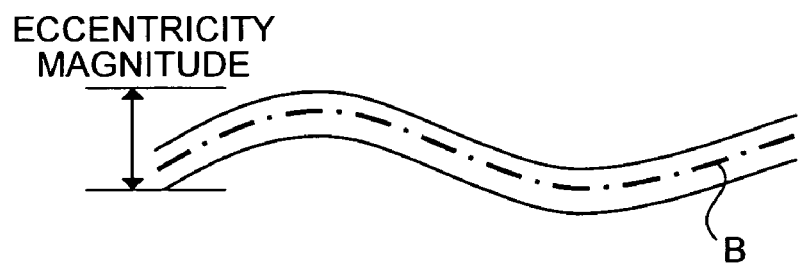
FIG. 11 is a schematic for explaining a conventional technology.
Figure 12:
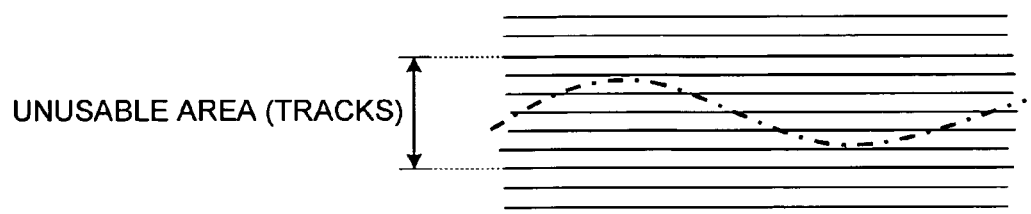
FIG. 12 is a schematic for explaining a conventional technology.
Figure 13:
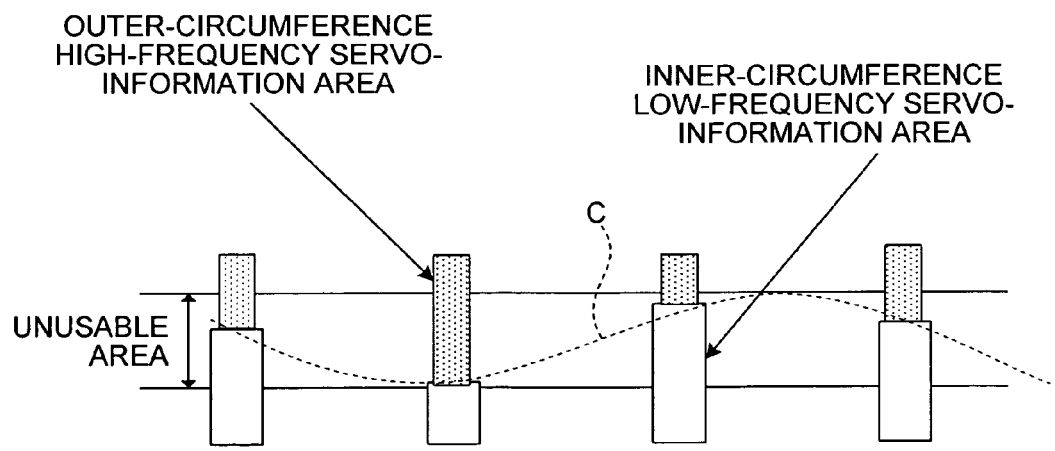
FIG. 13 is a schematic for explaining a conventional technology.

FIG. 7 is a drawing of a computer system 70 that executes a magnetic disk control program. The computer system 70 includes a random access memory (RAM) 71, a hard disk drive (HDD) 72, a servo demodulating unit 73, a read-only memory (ROM) 74, and a central processing unit (CPU) 75. The ROM 74 has stored therein programs implement the functions described in the first embodiment. In other words, the ROM 74 has stored therein a track selection program 74a, a servo-information deletion program 74b, a servo-information processing program 74c, a data writing program 74d, and a data reading program 74e.

The CPU 75 loads the track selection program 74a, the servo-information deletion program 74b, the servo-information processing program 74c, the data writing program 74d, and the data reading program 74e, and converts them to a track selection process 75a, a servo-information deletion process 75b, a servo information processing process 75c, a data writing process 75d, and a data reading process 75e. The track selection process 75a, the servo-information deletion process 75b, the servo information processing process 75c, the data writing process 75d, and the data reading process 753 correspond, respectively, to the track selecting unit 24a, the servo-information deleting unit 24b, the servo-information processing unit 24c, the data writing unit 26a, and the data reading unit 26b shown in FIG. 3.

The HDD 72 stores therein a servo demodulation table 72a containing the frequencies that are switched by the servo demodulating unit 73 when demodulating the servo information. The servo demodulation table 72a corresponds to the inner-circumference PLL 25a and the outer-circumference PLL 25b shown in FIG. 3.

Apart from the ROM 74, the track selection program 74a, the servo-information deletion program 74b, the servo-information processing program 74c, the data writing program 74d, and the data reading program 74e can be stored in portable physical media that can be inserted into the computer system 70, such as a flexible disk (FD), compact disk-read-only memory (CD-ROM), magneto optic (MO) disk, digital versatile disk (DVD), and integrated circuit (IC) card, or fixed physical media such as a hard disk drive (HDD) built into the computer system 70. Alternatively, the programs can be stored on another computer system connected to the computer system 70 and read and executed by the computer system 70 via a public circuit, Internet, local area network (LAN) or wide area network (WAN).

According to the present invention, the magnetic disk device holds a magnetic disk that has servo information written thereon at different frequencies in a plurality of different areas into which the magnetic disk is divided radially. The magnetic disk device creates on the magnetic disk concentric tracks as well as selects a dividing track that acts as a demarcation for switching the area from which servo information will be read. The magnetic disk device then deletes all the servo information that will not be read from each of the areas divided by the dividing track. Thus, the write frequency of the servo information can be increased in the area in the outer circumference and the number of tracks that are affected by the switching of the area from which the servo information is read can be limited to three. Consequently, the format volume can be increased and the number of unusable tracks can be limited.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A magnetic disk device that holds a magnetic disk having servo information written thereon, the magnetic disk device comprising:
    a magnetic disk holding unit that holds the magnetic disk having written thereon the servo information as a first set of servo information written, using a predetermined first frequency, in a first set of sectors disposed at predetermined intervals in a rotation direction of the magnetic disk and a second set of servo information written, using a predetermined second frequency, in a second set of sectors disposed at the predetermined intervals in the rotation direction of the magnetic disk at different positions from the positions of the first set of sectors; and
    a track selecting unit that creates concentric tracks on the magnetic disk held by the magnetic disk holding unit with the magnetic disk rotation center as the center of the concentric tracks and selects a dividing track that acts as a demarcation for switching areas from which the servo information is read.

2. The magnetic disk device according to claim 1, further comprising a servo-information deleting unit that deletes the servo information that is not read from each of the areas divided by the dividing track selected by the track selecting unit.

3. The magnetic disk device according to claim 1, wherein the magnetic disk holding unit holds the magnetic disk having servo information written inwards in an outer circumference area and outwards in an inner circumference area.

4. The magnetic disk device according to claim 1, further comprising a head evaluating unit that evaluates a head that reads the servo information from the magnetic disk, and
    wherein the track selecting unit selects the dividing track that acts as a demarcation for the areas from which the servo information will be read based on information obtained after the evaluation by the head evaluating unit.

5. The magnetic disk device according to claim 1, further comprising a servo demodulating unit that has provided therein a plurality of phase synchronizing circuits corresponding to the write frequencies of the servo information written to the magnetic disk.

6. A servo-information writing device that writes servo information onto a magnetic disk incorporated into a magnetic disk device, the servo-information writing device comprising:

a servo information writing unit that writes a first set of servo information, using a predetermined first frequency, in a first set of sectors disposed at predetermined intervals in a rotation direction of the magnetic disk and a second set of servo information, using a predetermined second frequency, in a second set of sectors disposed at the predetermined intervals in the rotation direction of the magnetic disk at different positions from the positions of the first set of sectors, wherein the servo information writing unit that writes servo information inwards in an outer circumference area of the magnetic disk and outwards in an inner circumference area of the magnetic disk.

7. A magnetic disk having written thereon servo information for controlling the position and speed of a head of a magnetic disk device, the magnetic disk comprising:

a first area where a first set of servo information is written using a predetermined first frequency, the first area being disposed at predetermined intervals in a rotation direction of the magnetic disk; and a second area where a second set of servo information is written using a predetermined second frequency, the second area being disposed at the predetermined intervals in the rotation direction of the magnetic disk at a different position from the position of the first area, wherein the servo information is written inwards in an outer circumference area of the magnetic disk and outwards in an inner circumference area of the magnetic disk.

8. A magnetic disk having written thereon servo information for controlling the position and speed of a head of a magnetic disk device, the magnetic disk comprising:

a first area where a first set of servo information is written using a predetermined first frequency, the first area being disposed at predetermined intervals in a rotation direction of the magnetic disk; and a second area where a second set of servo information is written using a predetermined second frequency, the second area being disposed at the predetermined intervals in the rotation direction of the magnetic disk at a different position from the position of the first area, wherein the first area is a first set of fan-shaped sectors that are narrow towards an inner circumference and broad towards an outer circumference of the magnetic disk and located at the predetermined intervals in the magnetic disk rotation direction, and the second area is a second set of fan-shaped sectors that are narrow towards the inner circumference and broad towards the outer circumference of the magnetic disk and located at the predetermined intervals in the rotation direction of the magnetic disk at different positions from positions of the first set of fan-shaped sectors.

9. A magnetic disk having written thereon servo information for controlling the position and speed of a head of a magnetic disk device, the magnetic disk comprising:

a first area where a first set of servo information is written using a predetermined first frequency, the first area being disposed at predetermined intervals in a rotation direction of the magnetic disk; and a second area where a second set of servo information is written using a predetermined second frequency, the second area being disposed at the predetermined intervals in the rotation direction of the magnetic disk at a different position from the position of the first area, wherein a dividing track that acts as a demarcation for switching areas from which the servo information will be read divides an inner circumference area from an outer circumference area, the inner circumference area being an area where the servo information is written at an inner-circumference frequency and the outer circumference area is an area where the servo information is written at an outer-circumference frequency.

10. A manufacturing method of a magnetic disk device applied for manufacturing a magnetic disk device configured to hold a magnetic disk having servo information written thereon, the method comprising:

writing the servo information as a first set of servo information written using a predetermined first frequency in a first set of sectors disposed at predetermined intervals in a rotation direction of the magnetic disk and a second set of servo information written using a predetermined second frequency in a second set of sectors disposed at the predetermined intervals in the rotation direction of the magnetic disk at different positions from the positions of the first set of sectors;

holding the magnetic disk having the servo information written thereon at the writing;

creating concentric tracks on the magnetic disk held at the holding with the magnetic disk rotation center as the center of the concentric tracks and selecting a dividing track that acts as a demarcation for areas from which the servo information is read; and deleting all the servo information that is not read from each of the areas divided by the dividing track selected at the creating step.

* * * * *